US012755372B2

(12) United States Patent
Maeda

(10) Patent No.: US 12,755,372 B2
(45) Date of Patent: Oct. 6, 2026

(54) INSPECTION APPARATUS, METHOD OF CONTROLLING INSPECTION APPARATUS, AND STORAGE MEDIUM

(71) Applicant: CANON KABUSHIKI KAISHA, Tokyo (JP)

(72) Inventor: Yusuke Maeda, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 260 days.

(21) Appl. No.: 18/630,141

(22) Filed: Apr. 9, 2024

(65) Prior Publication Data

US 2024/0378717 A1 Nov. 14, 2024

(30) Foreign Application Priority Data

May 11, 2023 (JP) ................................ 2023-078538

(51) Int. Cl.
*G06T 7/00* (2017.01)
*G06F 3/14* (2006.01)
*G06V 30/19* (2022.01)

(52) U.S. Cl.
CPC ................ *G06T 7/001* (2013.01); *G06F 3/14* (2013.01); *G06V 30/19093* (2022.01); *G06T 2207/30144* (2013.01)

(58) Field of Classification Search
None
See application file for complete search history.

(56) References Cited

U.S. PATENT DOCUMENTS 8,576,233 B2 * 11/2013 Miyazawa ............ G06F 40/109
715/269
11,836,398 B2 12/2023 Iida
2016/0085130 A1 * 3/2016 Timofejevs ............... E06B 9/40
359/275
2022/0156020 A1 5/2022 Iida
2022/0188543 A1 * 6/2022 Tatsumi ................. G06V 30/41
2023/0298160 A1 9/2023 Maeda

FOREIGN PATENT DOCUMENTS

JP 2021-024223 A 2/2021

* cited by examiner

*Primary Examiner* — Nancy Bitar
(74) *Attorney, Agent, or Firm* — Venable LLP

(57) ABSTRACT

An inspection apparatus performs a process depending on a type of each of blocks extracted from a reference image to be used for inspection settings in a case of inspecting a printed sheet, and obtains a character string and coordinates indicating a position of the character string for each block. The inspection apparatus compares the character string obtained from the reference image with a correct character string to determine the character string which is corresponding to the correct character string and is obtained from the reference image, and associates the coordinates indicating the position of the character string determined as the corresponding character string with the correct character string. The inspection apparatus makes a setting regarding an inspection area to be inspected in the printed sheet based on the coordinates associated with the correct character string.

10 Claims, 14 Drawing Sheets

701

| CORRECT CHARACTER STRING |
|---|
| abc |
| 0123 |
| efgh |
| 456 |

702

CORRECT CHARACTER STRING FOR COLLATION INSPECTION

703

| OUTPUT CHARACTER STRING | OUTPUT COORDINATES |
|---|---|
| abc | (1000, 100, 10, 20) |
| efgh | (1000, 150, 10, 40) |
| 0123 | (2000, 200, 10, 40) |
| 456 | (2000, 250, 10, 20) |
| iJk | (3000, 250, 10, 20) |

704 705

OCR RESULT AND CODE IMAGE DECODING RESULT

FIG.7A

706

| CORRECT CHARACTER STRING | OUTPUT COORDINATES |
|---|---|
| abc | (1000, 100, 10, 20) |
| efgh | (1000, 150, 10, 40) |
| 0123 | (2000, 200, 10, 40) |
| 456 | (2000, 250, 10, 20) |

702 705

CORRECT CHARACTER STRING FOR COLLATION INSPECTION AND COORDINATES

FIG.7B

701

| CORRECT CHARACTER STRING |
|---|
| abc (702) |
| 0123 |
| efgh |
| 456 |

CORRECT CHARACTER STRING FOR COLLATION INSPECTION

703

| OUTPUT CHARACTER STRING | OUTPUT COORDINATES |
|---|---|
| abo (1201) | (1000, 100, 10, 20) (1203) |
| efgh (1202) | (1000, 150, 10, 40) |
| 0123 | (2000, 200, 10, 40) |
| 456 | (2000, 250, 10, 20) |
| iJk | (3000, 250, 10, 20) |

OCR RESULT AND CODE IMAGE DECODING RESULT

FIG.12A

1204

| CORRECT CHARACTER STRING | OUTPUT COORDINATES |
|---|---|
| abc (702) | (1000, 100, 10, 20) (1203) |
| efgh | (1000, 150, 10, 40) |
| 0123 | (2000, 200, 10, 40) |
| 456 | (2000, 250, 10, 20) |

CORRECT CHARACTER STRING FOR COLLATION INSPECTION AND COORDINATES

FIG.12B

INSPECTION APPARATUS, METHOD OF CONTROLLING INSPECTION APPARATUS, AND STORAGE MEDIUM

BACKGROUND OF THE INVENTION

Field of the Invention

The present disclosure relates to a technique for inspecting print quality of a printed sheet.

Description of the Related Art

There has been known an inspection system for inspecting a printed sheet output from a printer apparatus. Such inspections include a printed image inspection to check whether or not a printed image is soiled and a data inspection to determine whether or not a character string or a character string expressed by a code image is correct. In a case where a printed sheet contains plural character strings or code images to be inspected by a data inspection, it is necessary to carry out work of associating the character strings and the code images in a reference image to serve as a basis for the inspection with their respective correct character strings. In the related art, this associating work is performed manually by a user, and thus places a heavy burden on the user. In this regard, Japanese Patent Laid-Open No. 2021-024223 discloses a technique of associating each of inspection targets with its coordinates embedded in a vector image to serve as a reference image, thereby enabling an easy inspection even if a layout of the inspection targets is changed.

SUMMARY OF THE INVENTION

An inspection apparatus according to the present disclosure is an inspection apparatus, including: an obtaining unit configured to perform a process depending on a type of each of blocks extracted from a reference image to be used for inspection settings in a case of inspecting a printed sheet, and obtain a character string and coordinates indicating a position of the character string for each block; an associating unit configured to compare the character string obtained from the reference image with a correct character string to determine the character string which is corresponding to the correct character string and is obtained from the reference image, and associate the coordinates indicating the position of the character string determined as the corresponding character string with the correct character string; and an inspection setting unit configured to make a setting regarding an inspection area to be inspected in the printed sheet based on the coordinates associated with the correct character string by the associating unit.

Further features of the present disclosure will become apparent from the following description of exemplary embodiments with reference to the attached drawings.

BRIEF DESCRIPTION OF THE DRAWINGS

FIGS. 7A and 7B are diagrams showing correct character strings and output coordinates based on OCR results and code image decoding results;

FIGS. 12A and 12B are diagrams showing correct character strings and output coordinates based on OCR results and code image decoding results.

DESCRIPTION OF THE EMBODIMENTS

Figure 1:
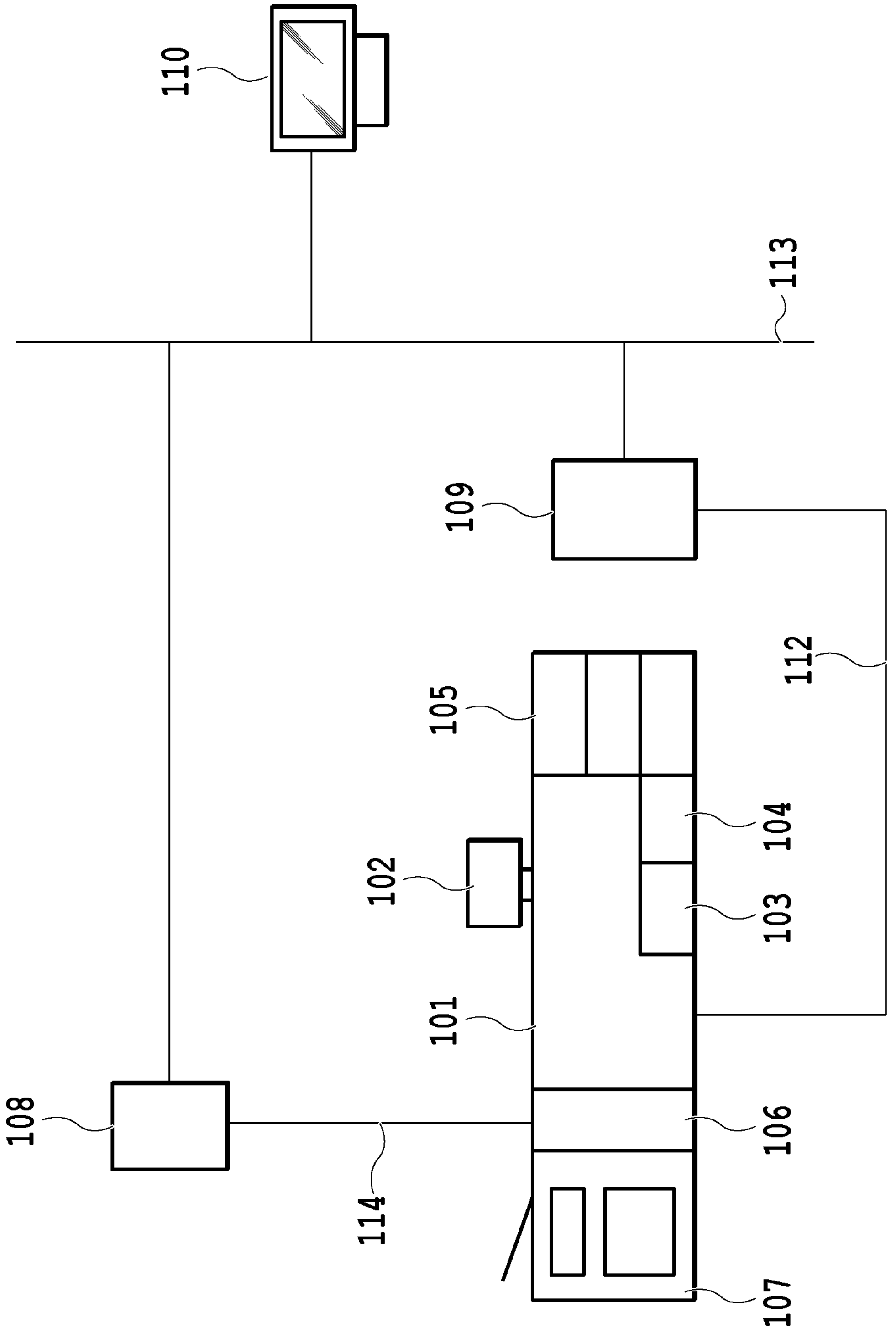
FIG. 1 is a schematic structural diagram of an inspection system.

Hereinafter, with reference to the attached drawings, the present disclosure is explained in detail in accordance with preferred embodiments. Configurations shown in the following embodiments are merely exemplary and the present disclosure is not limited to the configurations shown schematically. In addition, the same components are denoted by the same reference numerals. Further, each process (step) in the flowcharts and the sequence charts is denoted by a reference numeral starting with S.

First Embodiment

FIG. 1 is a schematic structural diagram of an inspection system in a present embodiment. An image forming apparatus in the present embodiment is described by using an electrophotographic type of an image forming apparatus, but the image forming apparatus in the present embodiment may be a different type of the image forming apparatus such as an ink-jet type of the image forming apparatus or an offset type of the image forming apparatus.

An image forming apparatus 101 is connected to an information processing apparatus 109 via a cable 112. The information processing apparatus 109 is connected via a network 103 to a client computer 110 and an inspection apparatus 108 configured to inspect print quality. The image forming apparatus 101 includes a user interface (UI) panel 102, a sheet feeder deck 103, and a sheet feeder deck 104. Moreover, the image forming apparatus 101 includes an optional deck 105 including three stacked sheet feeder decks. The UI panel 102 is a user interface equipped with, for example, a capacitive touch panel. The UI panel 102 is configured to display various kinds of information on the image forming apparatus 101 and receive user's operations. The image forming apparatus 101 includes an inspection unit 106 and a large-capacity stacker 107. The inspection unit 106 is connected to the inspection apparatus 108 via a cable 114. The large-capacity stacker 107 includes a main tray and a top tray, and the main tray is capable of stacking several thousand sheets.

The client computer 110 generates a print job and transmits the generated print job to the information processing apparatus 109 via a network 113, and the information processing apparatus 109 manages the print job. The information processing apparatus 109 transmits the print job to the image forming apparatus 101 via the cable 112. The image forming apparatus 101 after receiving the print job executes print processing on a sheet. Instead, the print job may be generated by the information processing apparatus 109. In this case, a configuration may be employed in which the information processing apparatus 109 transmits the print job to the image forming apparatus 101 via the cable 112, and the image forming apparatus 101 manages the print job. Instead, the client computer 110, the information processing apparatus 109, and the inspection apparatus 108 may be connected to each other via the cable 112 and communicate with the image forming apparatus 101 via the cable 112. In other words, the connection structure of the image forming apparatus 101, the information processing apparatus 109, and the client computer 110 described in the present embodiment is just an example, and the present embodiment may employ any of various connection structures other than the connection structure described in the present embodiment.

Figure 2:
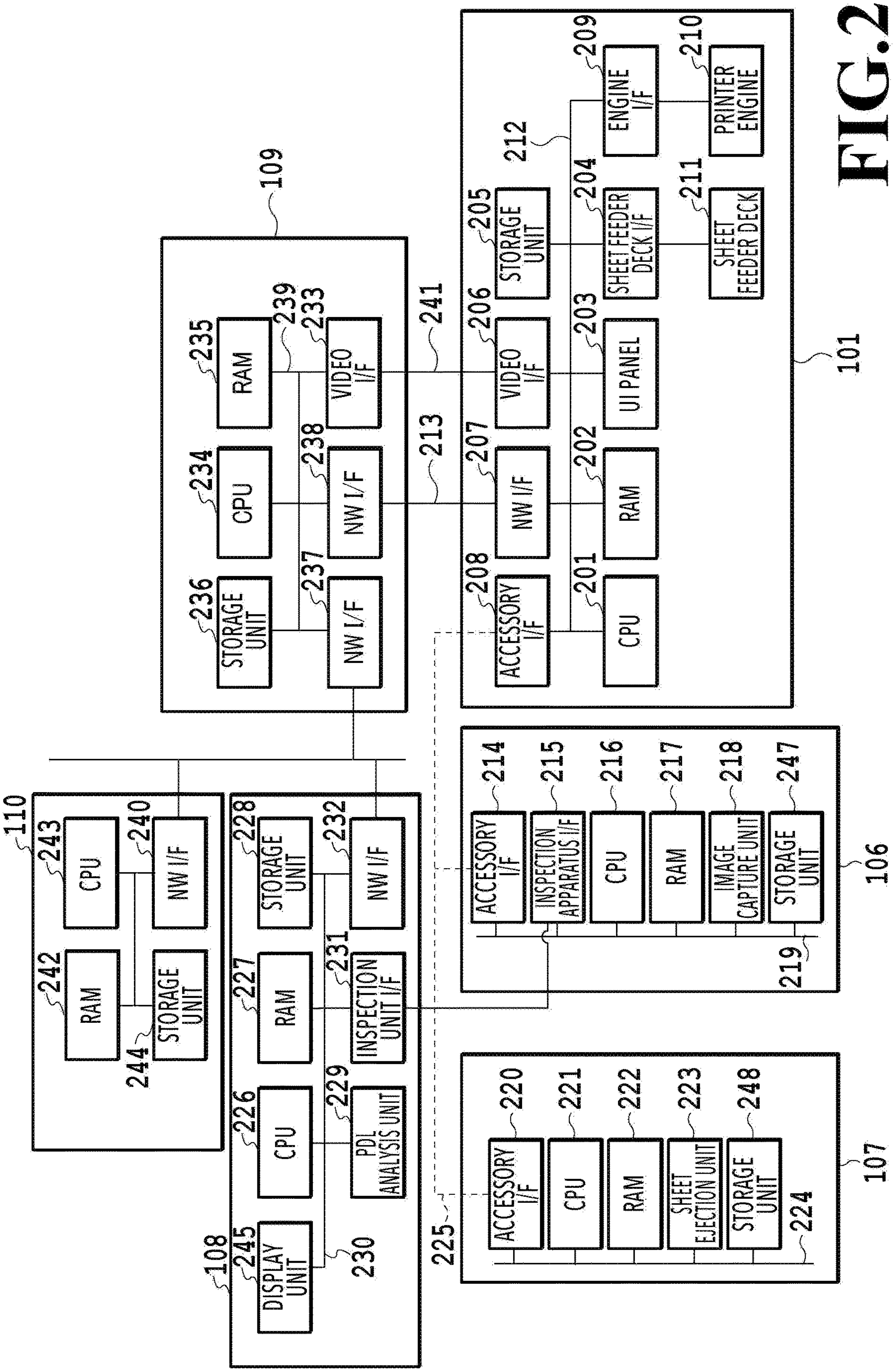
FIG. 2 is a block diagram illustrating hardware configurations of apparatuses in the inspection system.

FIG. 2 is a block diagram illustrating hardware configurations of the apparatuses in the inspection system according to the present embodiment. A central processing unit (CPU) 201 executes control and calculations for each subunit in the image forming apparatus 101 via a system bus 212. The CPU 201 executes a program stored in a storage unit 205 and loaded onto a random access memory (RAM) 202. The RAM 202 is a type of general volatile storage device directly accessible by the CPU 201, and is used as a work area for the CPU 201 or other temporary data storage areas. The storage unit 205 stores the program to be executed by the CPU 201 and also functions as a temporary storage area and a work memory during operations of the image forming apparatus 101.

An engine interface (I/F) 209 communicates with a printer engine 210 and controls the printer engine 210. A sheet feeder deck I/F 204 communicates with a sheet feeder deck 211 and controls the sheet feeder deck 211. The sheet feeder deck 211 is a general term for a hardware configuration including the sheet feeder deck 103, the sheet feeder deck 104, and the optional deck 105. A network interface (hereinafter referred to as "NW I/F") 207 is connected to a NW I/F 238 of the information processing apparatus 109 via a cable 213 and performs communication between the image forming apparatus 101 and the information processing apparatus 109. In the present embodiment, the interface of the image forming apparatus 101 connected to the system bus 212 and the interface of the information processing apparatus 109 connected to a system bus 239 are directly connected to each other. However, the connection structure is not limited to this, but may be a structure in which the information processing apparatus 109 and the image forming apparatus 101 are connected via, for example, a network or the like. A video I/F 206 is connected to a video I/F 233 via a video cable 241, and performs image data communication between the information processing apparatus 109 and the image forming apparatus 101. Here, as the connection interfaces in the information processing apparatus 109 with the image forming apparatus 101, a connection interface in which the functions of the NW I/F 238 and the video I/F 233 are integrated may be employed. Meanwhile, as the connection interfaces in the image forming apparatus 101 with the information processing apparatus 109, a connection interface in which the functions of the NW I/F 207 and the video I/F 206 are integrated may be employed. An accessory I/F 208 is connected via a cable 225 to an accessory I/F 214 of the inspection unit 106 and an accessory I/F 220 of the large-capacity stacker 107. In other words, the image forming apparatus 101 performs communications with the inspection unit 106 and the large-capacity stacker 107 via the accessory I/Fs 208, 214, and 220.

A CPU 216 of the inspection unit 106 performs control and calculations for each subunit in the inspection unit 106 via a system bus 219. The CPU 216 executes a program stored in a storage unit 247 and loaded onto a RAM 217. The RAM 217 is a type of general volatile storage device directly accessible by the CPU 216, and is used as a work area for the CPU 216 or other temporary data storage areas. The storage unit 247 stores the program to be executed by the CPU 216 and also functions as a temporary storage area and a work memory during operations of the inspection unit 106. An inspection apparatus I/F 215 is connected to an inspection unit I/F 231 via a cable 249. In other words, the inspection unit 106 communicates with the inspection apparatus 108 via the inspection apparatus I/F 215 and the inspection unit I/F 231. An image capture unit 218 has an image capture function equipped with, for example, a contact image sensor (hereinafter referred to as "CIS"), and is configured to capture an image of a printed sheet passing the inside of the inspection unit 106, and transmit the captured inspection image to the inspection apparatus 108 via the inspection apparatus I/F 215. The CIS is an example of the sensor and is not intended to limit an image capturing method of the image capture unit 218. The sensor may be another type of sensor such as a CCD image sensor.

A CPU 220 of the large-capacity stacker 107 performs control and calculations for each subunit in the large-capacity stacker 107 via a system bus 224. The CPU 220 executes a program stored in a storage unit 248 and loaded onto a RAM 222. The RAM 222 is a type of general volatile storage device directly accessible by the CPU 220, and is used as a work area for the CPU 220 or other temporary data storage areas. The storage unit 248 stores the program to be executed by the CPU 220 and also functions as a temporary storage area and a work memory during operations of the large-capacity stacker 107. A sheet ejection unit 223 performs sheet ejection operations to the main tray and the top tray, and monitors and controls a sheet stacking state of each of the main tray and the top tray.

A CPU 226 of the inspection apparatus 108 performs control and calculations for each subunit in the inspection apparatus 108 via a system bus 230. The CPU 226 executes a program stored in a storage unit 228 and loaded onto a RAM 227. The RAM 227 is a type of general volatile storage device directly accessible by the CPU 226, and is used as a work area for the CPU 226 or other temporary data storage areas. The storage unit 228 stores the program to be executed by the CPU 226 and also functions as a temporary storage area and a work memory during operations of the inspection apparatus 108. A PDL analysis unit 229 reads PDL data such as, for example, PDF, PostScript, or PCL data received from the client computer 110 and the information processing apparatus 109, and executes interpretation process. A display control unit 245 is, for example, a touch panel connected to the inspection apparatus 108. The display control unit 245 receives user's inputs to the inspection apparatus 108 and displays a state of the inspection apparatus 108.

A CPU 234 of the information processing apparatus 109 performs control and calculations for each subunit in the information processing apparatus 109 via the system bus 239. The CPU 234 executes a program stored in a storage unit 236 and loaded onto a RAM 235. The RAM 235 is a type of general volatile storage device directly accessible by the CPU 234, and is used as a work area for the CPU 234 or other temporary data storage areas. The storage unit 236 stores the program to be executed by the CPU 234 and also functions as a temporary storage area and a work memory during operations of the information processing apparatus 109. A NW I/F 237 is connected to a NW I/F 232 and a NW I/F 240 via the network. The information processing apparatus 109 communicates with the inspection apparatus 108 via the NW I/F 237 and the NW I/F 232. The information processing apparatus 109 communicates with client computer 110 via the NW I/F 237 and the NW I/F 240.

A CPU 243 of the client computer 110 performs control and calculations for each subunit in the client computer 110 via a system bus 246. The CPU 243 executes a program stored in a storage unit 244 and loaded onto a RAM 242. The RAM 242 is a type of general volatile storage device directly accessible by the CPU 243, and is used as a work area for the CPU 243 or other temporary data storage areas. The storage unit 244 stores the program to be executed by the CPU 243 and also functions as a temporary storage area and a work memory during operations of the client computer 110.

Figure 3:
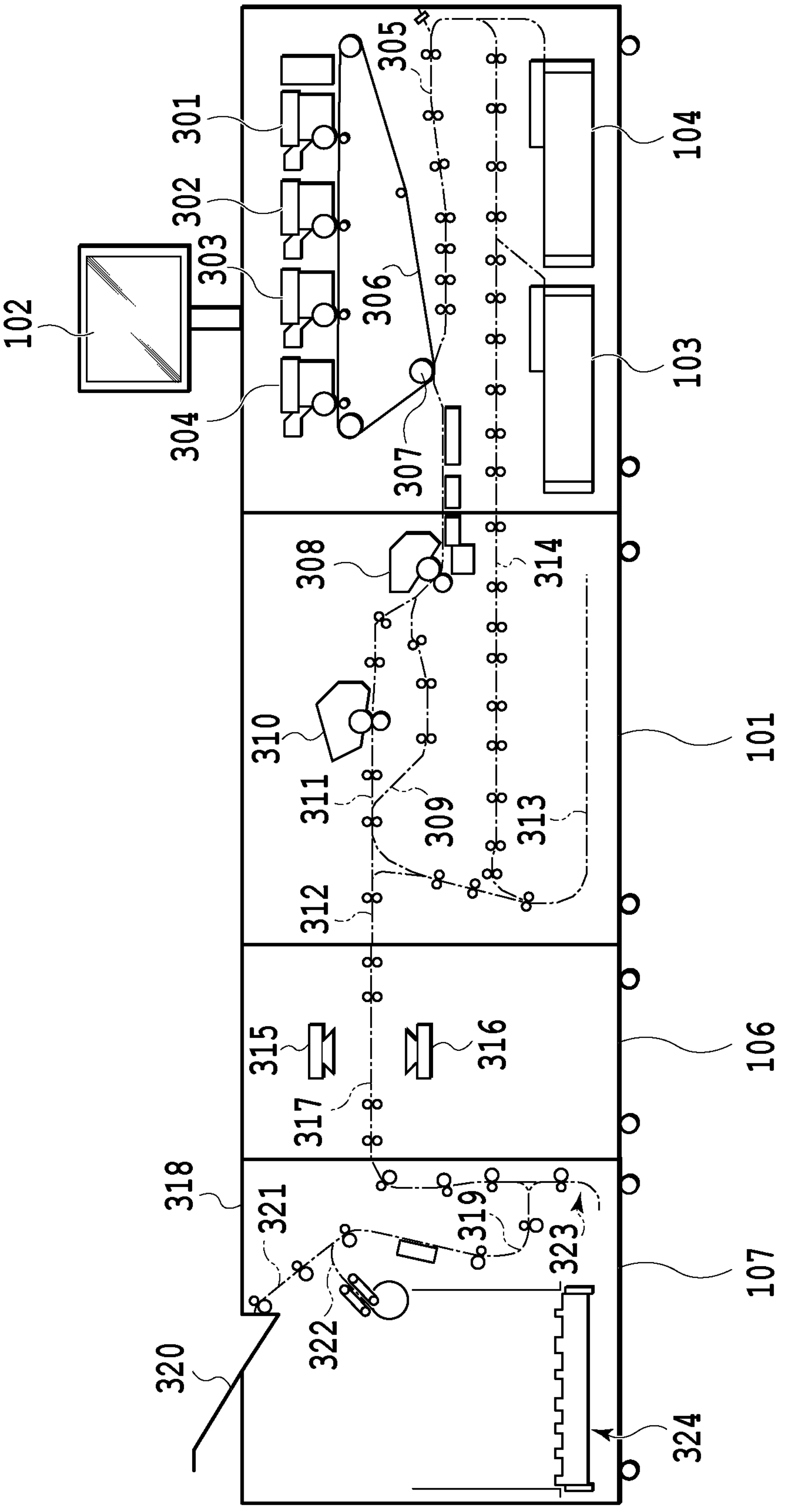
FIG. 3 is a diagram illustrating internal structures of an image forming apparatus, an inspection unit, and a large-capacity stacker.

FIG. 3 is a diagram illustrating internal structures of the image forming apparatus 101, the inspection unit 106, and the large-capacity stacker 107. The image forming apparatus 101 receives user's inputs via the UI panel 102 and displays a printing state and an apparatus state on the UI panel 102. Various types of sheets can be stored in the sheet feeder deck 103 and the sheet feeder deck 104. Each of the sheet feeder deck 103 and the sheet feeder deck 104 is capable of separating just a top sheet from the stored sheets and conveying the sheet to a sheet conveyance path 305. In order to form a color image, development stations 301, 302, 303, and 304 form toner images using Y, M, C, and K color toners, respectively. The toner images formed by the development stations 301, 302, 303, and 304 are primarily transferred to an intermediate transfer belt 306. The intermediate transfer belt 306 rotates in a clockwise direction in FIG. 3 and, at a secondary transfer position 307, transfers the toner images onto a sheet conveyed from the sheet conveyance path 305. A fixing unit 308 includes a pressure roller and a heat roller, and allows a sheet to pass between the rollers. The fixing unit 308 fixes the toner images onto the sheet by fusing the toners and pressing the fused toners onto the sheet. After passing through the fixing unit 308, the sheet is conveyed to an end point 312 via a sheet conveyance path 309. In some type of sheet, the toners are required to be further fused and pressed for fixing. In such case, after passing through the fixing unit 308, the sheet is conveyed to a second fixing unit 310 by using an upper sheet conveyance path. After the additional fusing and pressing are performed in the second fixing unit 310, the sheet is conveyed to the end point 312 through a sheet conveyance path 311. In a case where an image formation mode is a double-sided mode, the sheet is conveyed to a sheet reversing path 313. The sheet is revered in the sheet reversing path 313, is conveyed to a both-side conveyance path 314, and is subjected to image transfer onto the second side at the secondary transfer position 307.

In the inspection unit 106, a CIS 315 and a CIS 316 are arranged to face each other. The CIS 315 is a sensor for reading an upper side of a printed sheet, whereas the CIS 316 is a sensor for reading a lower side of the printed sheet. The inspection unit 106 scans the printed sheet by using the CIS 315 and the CIS 316 at timing when the sheet conveyed to a sheet conveyance path 317 from the end point 312 of the image forming apparatus 101 reaches a predetermined position. The scanned image data is transmitted to the inspection apparatus 108 via the inspection apparatus I/F 215 and the inspection unit I/F 231. The CPU 226 of the inspection apparatus 108 determines whether or not the received image has a printing defect, and notifies the inspection unit 106 of the determination result again via the inspection unit I/F 231 and the inspection apparatus I/F 215. The CPU 216 of the inspection unit 106 notifies the large-capacity stacker 107 of the received determination result via the accessory I/F 214 and the accessory I/F 220.

The large-capacity stacker 107 is capable of stacking a large amount of printed sheets. The large-capacity stacker 107 includes a main tray 324 as a tray for stacking printed sheets. After passing through the inspection unit 106, the printed sheet is conveyed into the large-capacity stacker 107 from the sheet conveyance path 317. The printed sheet is conveyed to the main tray 324 from a sheet conveyance path 319 through a sheet conveyance path 322 and then is stacked in the main tray 324. Moreover, the large-capacity stacker 107 includes a top tray 320 as a sheet ejection tray. A CPU 221 of the large-capacity stacker 107 ejects, to the top tray 320, a printed sheet from which a printing defect is detected by the inspection apparatus 108. In a case of ejecting a printed sheet to the top tray 320, the printed sheet is conveyed to the top tray 320 from the sheet conveyance path 319 through a sheet conveyance path 321. A reversing unit 323 is a unit for reversing a printed sheet. This reversing unit 323 is used in a case of stacking a printed sheet on the main tray 324. In a case of stacking a printed sheet on the main tray 324, the reversing unit 323 reverses the printed sheet once so that the orientation of the sheet entering the large-capacity stacker 107 can be the same as the orientation of sheets stacked on the main tray 324. In a case of conveying the printed sheet to the top tray 320, the printed sheet is ejected to the top tray 320 without being flipped, and therefore the operation of reversing the printed sheet in the reversing unit 323 is skipped.

Hereinafter, main process in the present embodiment is described in reference to flowcharts and an example of UI screens displayed on the UI panel 102. The inspections include two types of inspections, that is, a printed image inspection to check a defect such as a soil on a printed image and a data inspection inspect whether there is a data defect by comparing a character string obtained by decoding a code image (a bar code or two-dimensional code) with a correct character string described in a correct file. In the present disclosure, the process for the data inspection is mainly used, and therefore the data inspection is mainly described below.

A program of the image forming apparatus 101 according to the present flow is stored in the storage unit 205 of the image forming apparatus 101, read by the RAM 202, and executed by the CPU 201. A program of the inspection apparatus 108 according to the present flow is stored in the storage unit 228 of the inspection apparatus 108, read by the RAM 227, and executed by the CPU 226. A program of the information processing apparatus 109 according to the present flow is stored in the storage unit 236 of the information processing apparatus 109, read by the RAM 235, and executed by the CPU 234. A program of the client computer 110 according to the present flow is stored in the storage unit 244 of the client computer 110, read by the RAM 242, and executed by the CPU 243.

Figure 4:
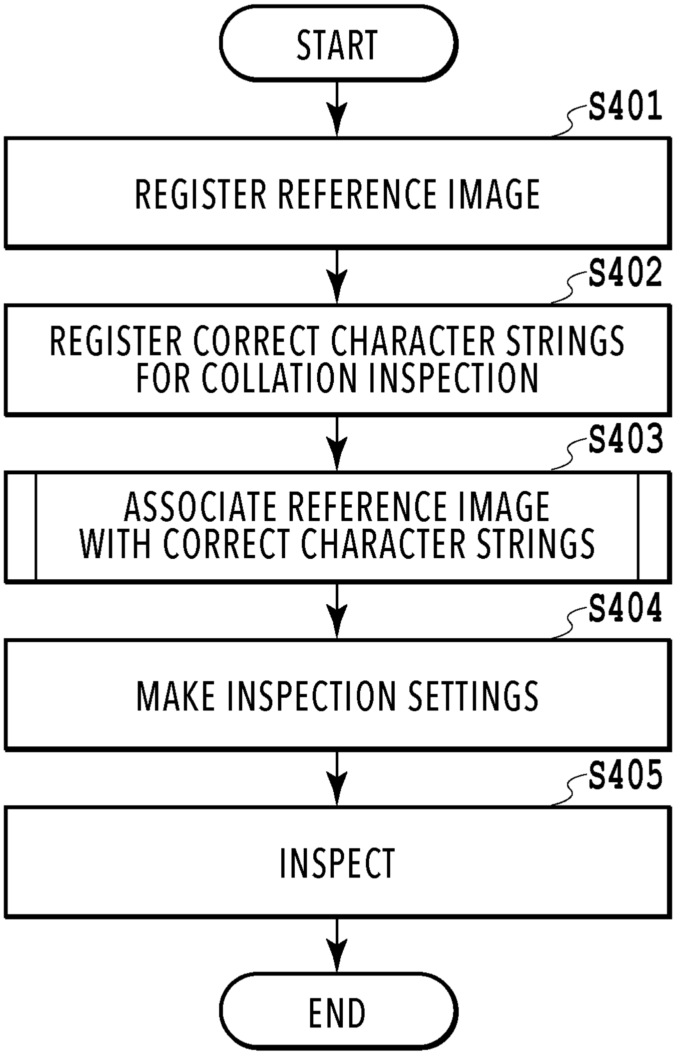
FIG. 4 is a flowchart showing an outline of inspection process.

An overall flow from an inspection start to an inspection execution is described in reference to a flowchart in FIG. 4. In S401, a user registers a reference image to the inspection apparatus 108. The reference image serves as an inspection basis and is to be used in a print process and a printed image inspection process. Specifically, the inspection apparatus 108 starts a process of reading the reference image and the client computer 110 executes a print job for reference image registration. Based on the print job, the inspection unit 106 reads a printed sheet generated in the image forming apparatus 101 and transmits the read image data as the reference image to the inspection apparatus 108. The inspection apparatus 108 reads the reference image transmitted from the inspection unit 106 and registers the reference image. After the reference image is registered in the inspection apparatus 108, the process proceeds to S402.

In S402, the user registers correct character strings for a collation inspection to the inspection apparatus 108. The correct character strings for the collation inspection are data stored in a data inspection reference file (correct file) to be referred to for collating in a data inspection. The reference file is a file that should be prepared in advance by the user. The reference file contains a list of correct character strings for character string inspections and correct character strings encoded in code images. In executing a data inspection, the CPU 226 of the inspection apparatus 108 performs the collation between the correct character strings listed in the reference file and character strings of character string image OCR results in character string inspection areas and code image decoding results. After the correct character strings for the collation inspection are registered in the inspection apparatus 108, the process proceeds to S403.

In S403, the CPU 226 of the inspection apparatus 108 performs a process of associating the reference image registered in S401 and the correct character strings registered in S402, and the process proceeds to S404. This process is described in detail later with reference to a flowchart in FIG. 5. In S404, the user makes inspection settings and the process proceeds to S405. The inspection settings mean to make settings of various types of inspection parameters, inspection areas, inspection levels, a sequential number inspection, and the like by using a UI screen. The inspection settings are described in detail later. In S405, the inspection apparatus 108 starts the inspection, and the client computer 110 executes a print job for the inspection. The image forming apparatus 101 executes printing based on the print job. In a case where the conveyance of a printed sheet conveyed from the image forming apparatus 101 is detected, the inspection unit 106 scans the printed sheet with the CIS 315 and the CIS 316 to obtain an inspection image (scanned image). The inspection image is transmitted from the inspection unit 106 to the inspection apparatus 108, and is saved in the RAM 227 of the inspection apparatus 108. The CPU 226 of the inspection apparatus 108 compares the saved inspection image with the reference image and then outputs an inspection result. This inspection is executed based on the setting values designated by the user in the inspection settings. After the inspection on the sheets in a number specified in the print job is completed, the process in the flowchart shown in FIG. 4 ends.

Next, the process of associating the reference image with the correct character strings (the process in S403) is described with reference to the flowcharts shown in FIGS. 5 and 6 and FIGS. 7A and 7B. FIG. 7A is a diagram showing an example of correct character strings for a collation inspection and an example of OCR results and code image decoding results. FIG. 7B is a diagram showing an example of a database of the correct character strings for the collation inspection and their coordinates (hereinafter, referred to as "the correct character string database").

Figure 5:
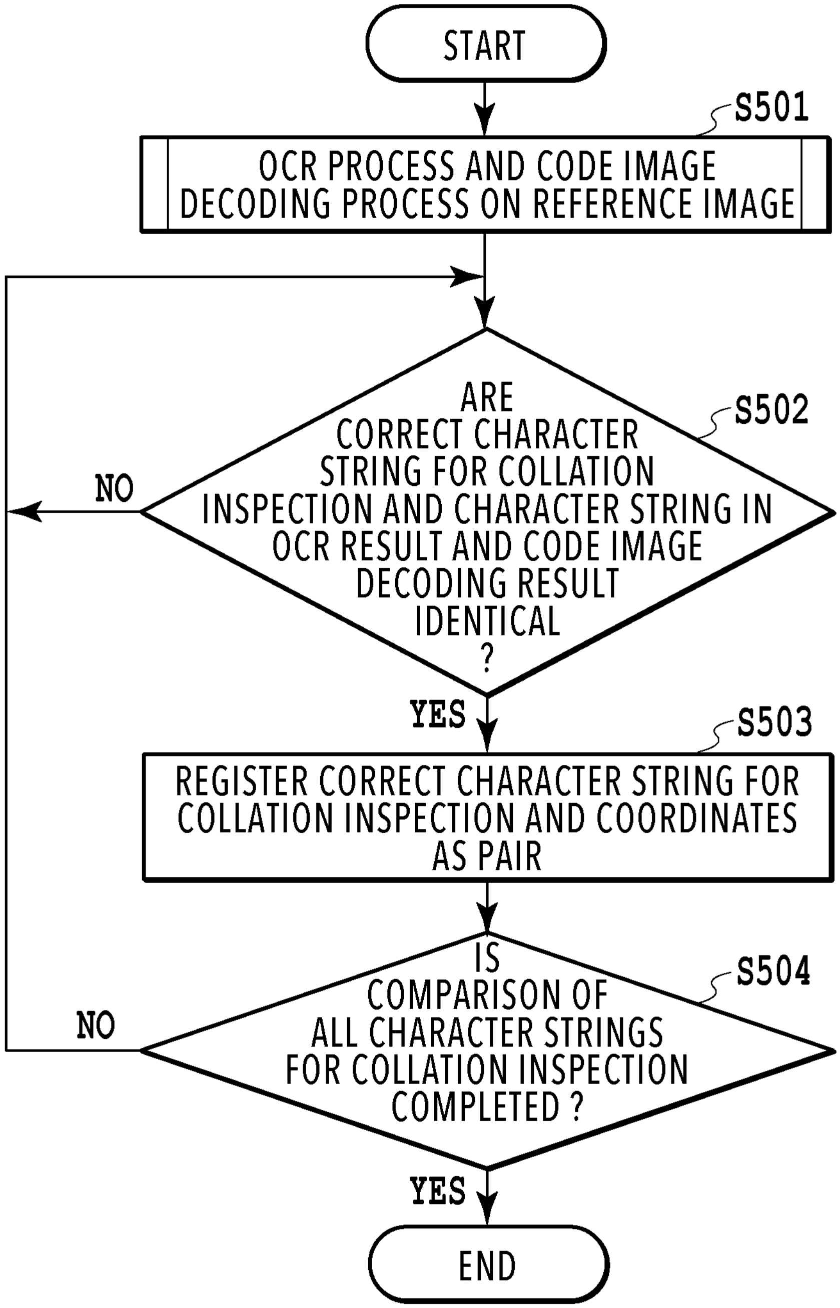
FIG. 5 is a flowchart showing a process of associating character strings in a reference image with their correct character strings.

The process of associating the reference image with the correct character strings is described in reference to the flowchart in FIG. 5. In S501, the CPU 226 of the inspection apparatus 108 executes a process of obtaining the character strings and their coordinates in the reference image, and the process proceeds to S502. In S502, the CPU 226 of the inspection apparatus 108 compares the correct character strings for the collation inspection with the character strings in the OCR results and code image decoding results obtained in S501 (the character strings extracted from the reference image). Specifically, the CPU 226 of the inspection apparatus 108 determines whether or not each of the "correct character strings for the collation inspection" shown in FIG. 7A is identical with the output character string in one of the "OCR results and code image decoding results" shown in FIG. 7A. In a case where the compared character strings are identical, the process proceeds to S503. In a case where the compared character strings are not identical, the process returns to S502 and the correct character string is compared with another "OCR results and code image decoding results".

In S503, the CPU 226 of the inspection apparatus 108 registers the correct character string for the collation inspection and the coordinates of the "output character string" corresponding to the correct character string as a pair to a correct character string database 706 in the RAM 227 (see FIG. 7B). In this way, the correct character string is associated with the coordinates expressing the position to be inspected. In this associating, the correct string and the coordinates may be directly associated with each other and managed as in FIG. 7B, or may be associated with each other indirectly via a predetermined parameter and managed. In S504, the CPU 226 of the inspection apparatus 108 determines whether or not the comparison of all the correct character strings for the collation inspection is completed. In a case where the comparison of all the correct character strings for the collation inspection is not completed, the process returns to S502. In a case where the comparison of all the correct character strings for the collation inspection is completed, the process of the flowchart shown in FIG. 5 ends.

Figure 6:
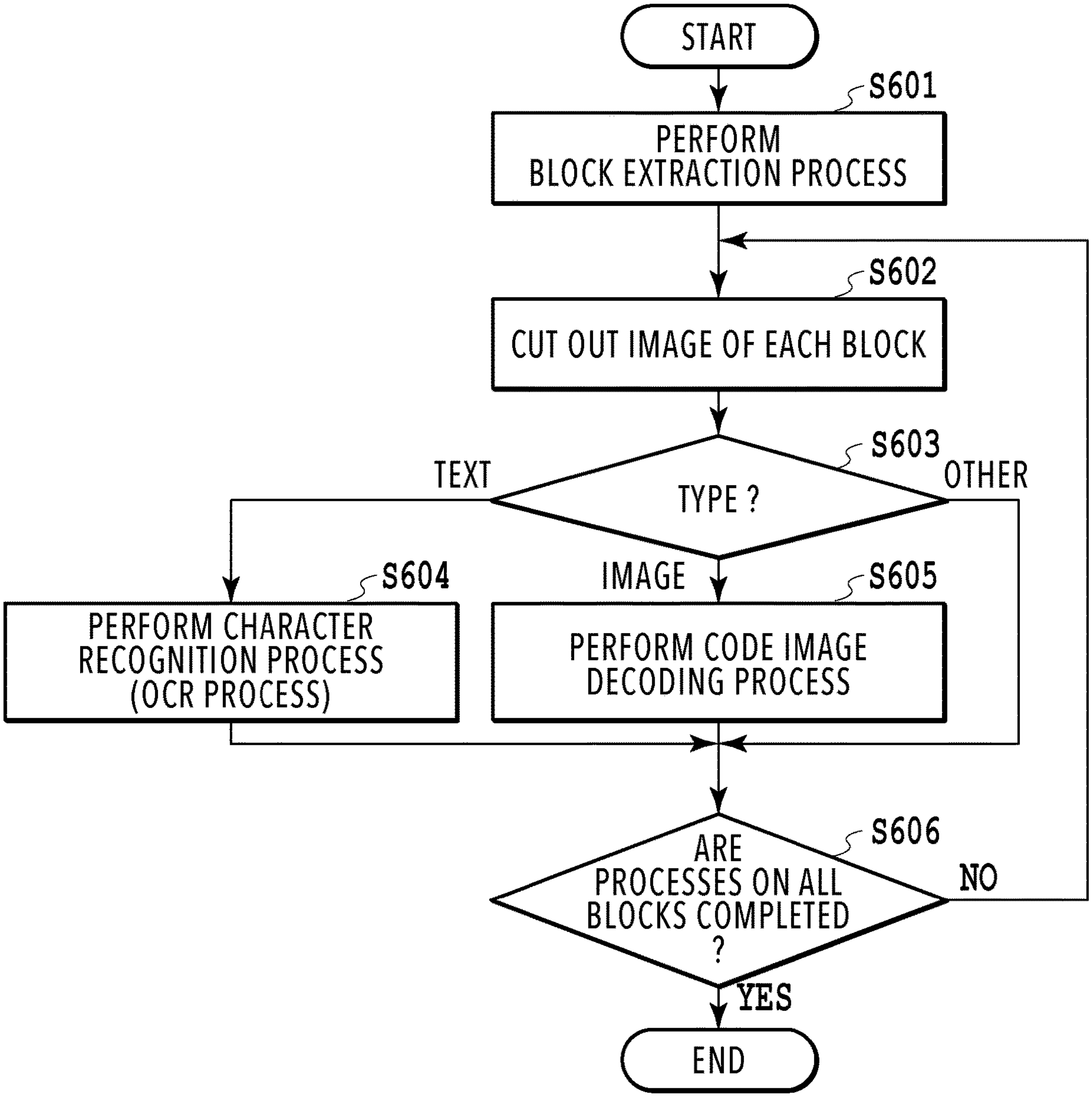
FIG. 6 is a flowchart showing an OCR process and a code image decoding process on an image.

The process of obtaining the character strings and their coordinates in of the reference image is described in reference to the flowchart in FIG. 6. In S601, the CPU 226 of the inspection apparatus 108 extracts blocks for each type of contents from the reference image and the process proceeds to S602. A loop process in S602 to S606 is iterated the same number of times as the number of the blocks extracted in the block extraction process executed in S601. In S602, the CPU 226 of the inspection apparatus 108 cuts out an image of each block from the reference image. After the cutting-out of the images of all the blocks is completed, the process proceeds to S603. In S603, the CPU 226 of the inspection apparatus 108 determines a type of the image of each of the cut-out blocks. After the types of all the images of the cut-out blocks are determined, the process proceeds to S604 to S606.

In a case where the type is determined as a text in S603, the process proceeds to S604. In S604, the CPU 226 of the inspection apparatus 108 performs a character recognition process on the image of each of the cut-out blocks, and the process proceeds to S606. The character recognition process is executed by optical character recognition (OCR). Through the OCR process, the CPU 226 obtains, as an OCR result, the character string and the region coordinates of the OCR-processed character string, and stores the OCR result to the RAM 227. Since the OCR process is executed by using a known method, the detailed description is omitted herein.

In a case where the type is determined as an image in S603, the process proceeds to S605. In S605, the CPU 226 of the inspection apparatus 108 performs a code image decoding process on the image of each of the cut-out blocks, and the process proceeds to S606. In a case where the CPU 226 obtains a character string embedded in the code image as a code image decoding result through the decoding process, the CPU 226 obtains the character string and the region coordinates of the code image, and stores the code image decoding result to the RAM 227. Since the code image decoding process is executed by using a known method, the detailed description is omitted herein. In a case where the type is determined as something other than a text and an image in S603, the process proceeds to S606.

In S606, the CPU 226 of the inspection apparatus 108 determines whether or not the process in S602 on all the blocks is completed. In a case where the process in S602 on all the blocks is not completed, the process returns to S552. In a case where the process in S602 on all the blocks is completed, the process in the flowchart shown in FIG. 6 ends.

Figure 8A:
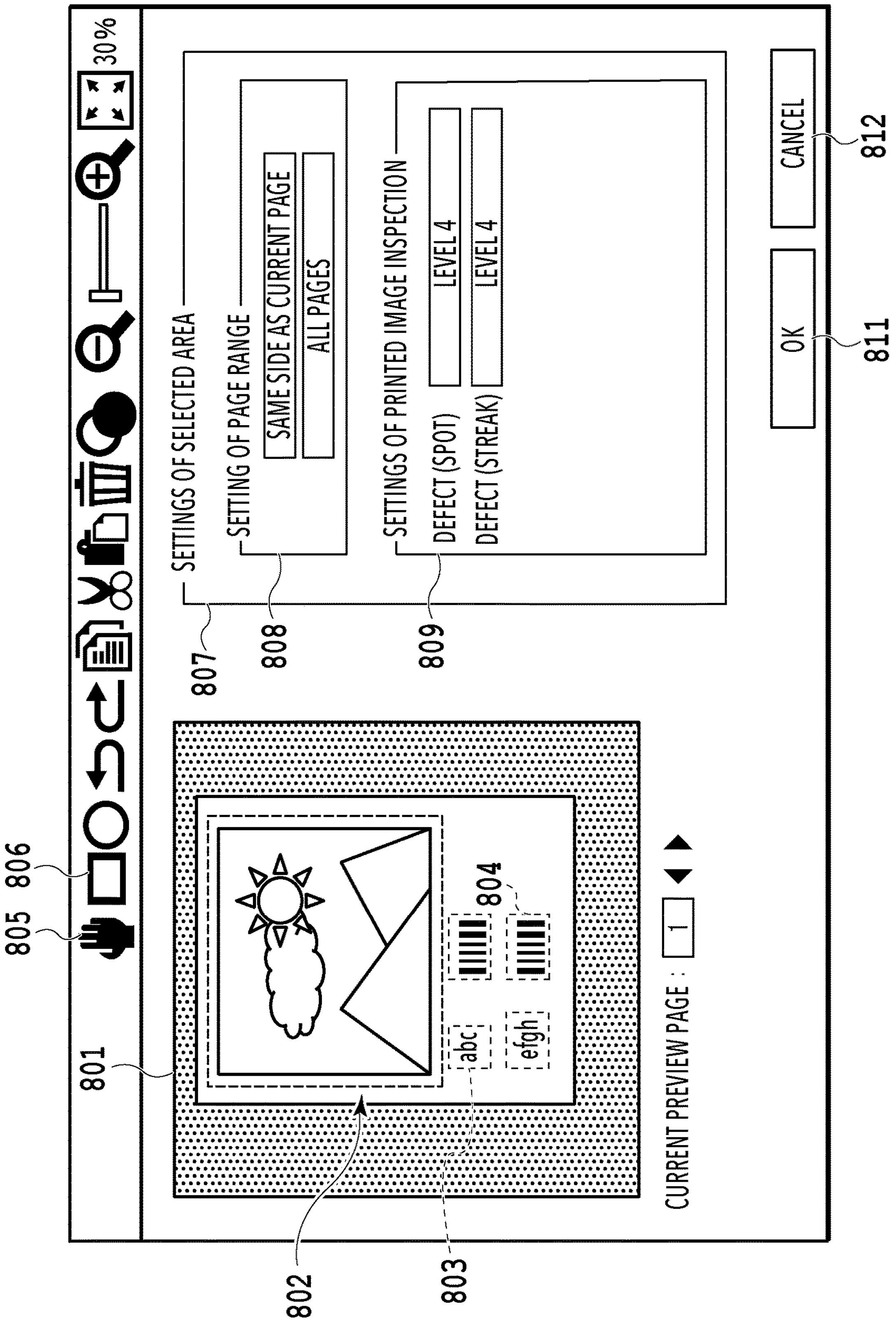
FIGS. 8A, 8B, and 8C are diagrams illustrating inspection setting screens for a printed image inspection, a character string inspection, and a code image inspection.
Figure 8B:
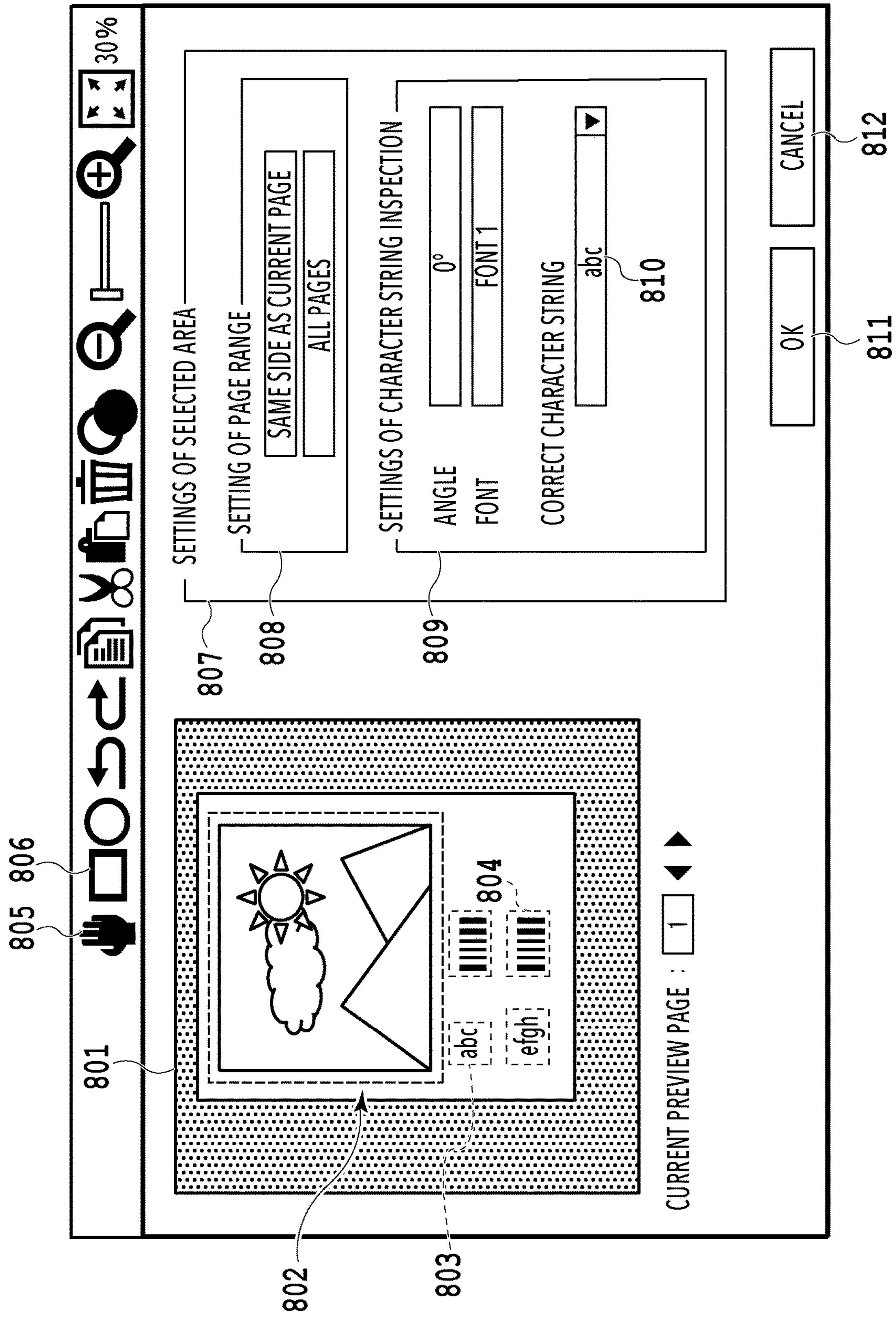
Figure 8C:
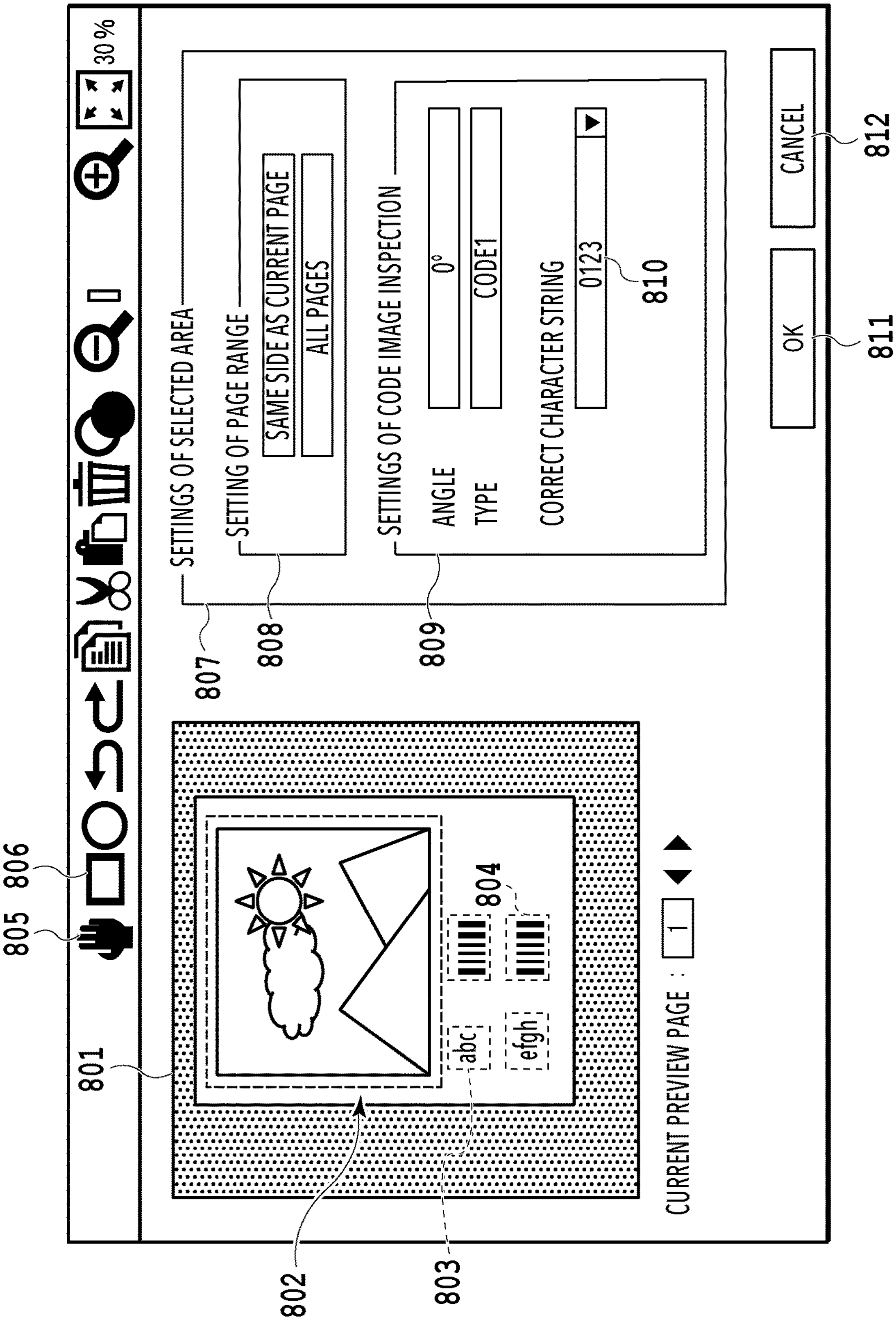

Next, details of the inspection settings are described with reference to diagrams illustrating UI screens in FIGS. 8A to 8C and a flowchart shown in FIG. 9. In response to a user's selection of a reference image registered in the reference registration, an inspection setting process is started. FIGS. 8A to 8C illustrate an example of inspection setting screens each of which is for receiving a user's execution operation of inspection settings. The inspection apparatus 108 causes the inspection setting screen to be displayed on the UI panel 102 of the image forming apparatus 101 via the inspection unit 106. On the inspection setting screen, the user is allowed to arrange inspection areas on the previewed reference image and make settings for each inspection area individually. In the present embodiment, as described later, the inspection areas can be initially arranged based on the information that associates the correct character strings with the position coordinates of the regions in FIG. 7B, resulting in reducing the user's work of manually arranging the inspection areas. The user is allowed to correct the inspection areas initially arranged or add a new inspection area as needed.

An area 801 is a preview display screen on which the reference image is displayed. In a case of reference images in a print job for plural pages, the reference image of each page can be displayed by receiving an operation for switching the previewed reference image to next one. A printed image inspection area 802, character string inspection areas 803, and code image inspection areas 804 are frames indicating the inspection areas arranged in the preview. Each inspection area is arranged by using an inspection area arrangement button 806 and can be changed in size and position according to a user's mouse dragging operation. FIGS. 8A to 8C show examples in which a printed image is arranged in the printed image inspection area 802, character strings are arranged in the character string inspection areas 803, and bar codes are arranged in the code image inspection areas 804. The example where the bar codes are arranged is just one example. Instead, two-dimensional codes may be arranged in the code image inspection areas 804.

The inspection area is selected by using an inspection area selection button 805. In a case where the user presses down the inspection area selection button 805 and then clicks any of the printed image inspection area 802, the character string inspection areas 803, and the code image inspection areas 804 with a mouse, an inspection area selection operation is received. Meanwhile, an inspection area arrangement operation is received in a case where the user first presses down the inspection area arrangement button 806, and then selects a type of an inspection area from a pull-down menu displayed, and selects an area desired to be designated as an inspection area on the preview display by dragging the mouse.

An area 807 displays setting items for the selected area, more specifically, setting values specific to the inspection area selected by using the inspection area selection button 805. An area 808 is for a setting item for a page range. In a case where the user presses down any of the buttons, an operation of designating a page range for executing an inspection on the selected area is received. In a case where none of the buttons is selected, the inspection area currently selected is arranged only on the page currently displayed on the preview display screen. In a case where "the same side as the current page" is selected, the selected inspection area is arranged on the page on the same side according to whether the selected inspection area is arranged on the front side or the back side of the sheet. In a case where "all pages" is selected, the inspection area is arranged on all the pages.

An area 809 displays setting items for each type of inspection area, more specifically, setting items depending on the type of inspection area selected by using the inspection area selection button 805. FIG. 8A illustrates printed image inspection setting items displayed in a case where the printed image inspection area 802 is selected. The printed image inspection setting items include items for a printed sheet inspection such as an inspection item for designating what type of defect is to be inspected and an inspection level for designating how minute defect is to be detected. The inspection items include, for example, a circular printing defect (spot), a linear printing defect (streak), and so on. The inspection level includes, for example, five levels from an inspection level 1 to an inspection level 5. The inspection level 5 is for detecting a more minute printing defect than in the inspection level 1. The level can be set for each inspection item such that the inspection level 5 is set for a spot defect and the inspection level 4 is set for a streak defect. FIG. 8B illustrates character string inspection setting items displayed in a case where the character string inspection area 803 is selected. For each inspection area, an angle of the inspection area, the font of the character string, and the correct character string for the collation inspection are set. The item for font selection of the character string is displayed and a font selection is received from the user. Such optional setting of font designation makes it possible to improve the recognition accuracy in OCR in an inspection. FIG. 8C illustrates code image inspection setting items displayed in a case where the code image inspection area 804 is selected. For each inspection area, an angle of the inspection area, the type of code, and the correct character string for the collation inspection are set. In the present embodiment, the screen displays only the setting items suited for the type of the selected inspection area without displaying the irrelevant items, but the display method is not limited to this. In one possible method, all the items are displayed while the irrelevant items are disabled, or in another possible method, the irrelevant items are folded and hidden.

An area 810 displays the correct character string for the collation inspection. In a case of execution of a data inspection, the collation is performed between the OCR result or the code image decoding result and the correct character string contained in the area 810. An area 811 is an inspection setting completion button ("OK" button). In a case where the user presses down the "OK" button, the CPU 226 of the inspection apparatus 108 completes the inspection settings, saves the inspection settings in the storage unit 228, and ends the inspection setting process. In a case where there is an inconsistency in the settings, the CPU 226 of the inspection apparatus 108 may disable the area 811 as the inspection setting completion button, and disable the user from pressing down the inspection setting completion button. An example of an inconsistency in the settings is a case where an inspection area targeted for the collation inspection execution is present but no data is set in the setting item for the collation inspection, or the like. An area 812 is an inspection setting cancel button. In a case where the user presses down the cancel button, the CPU 226 of the inspection apparatus 108 discards the inspection settings and ends the inspection setting process.

Figure 9:
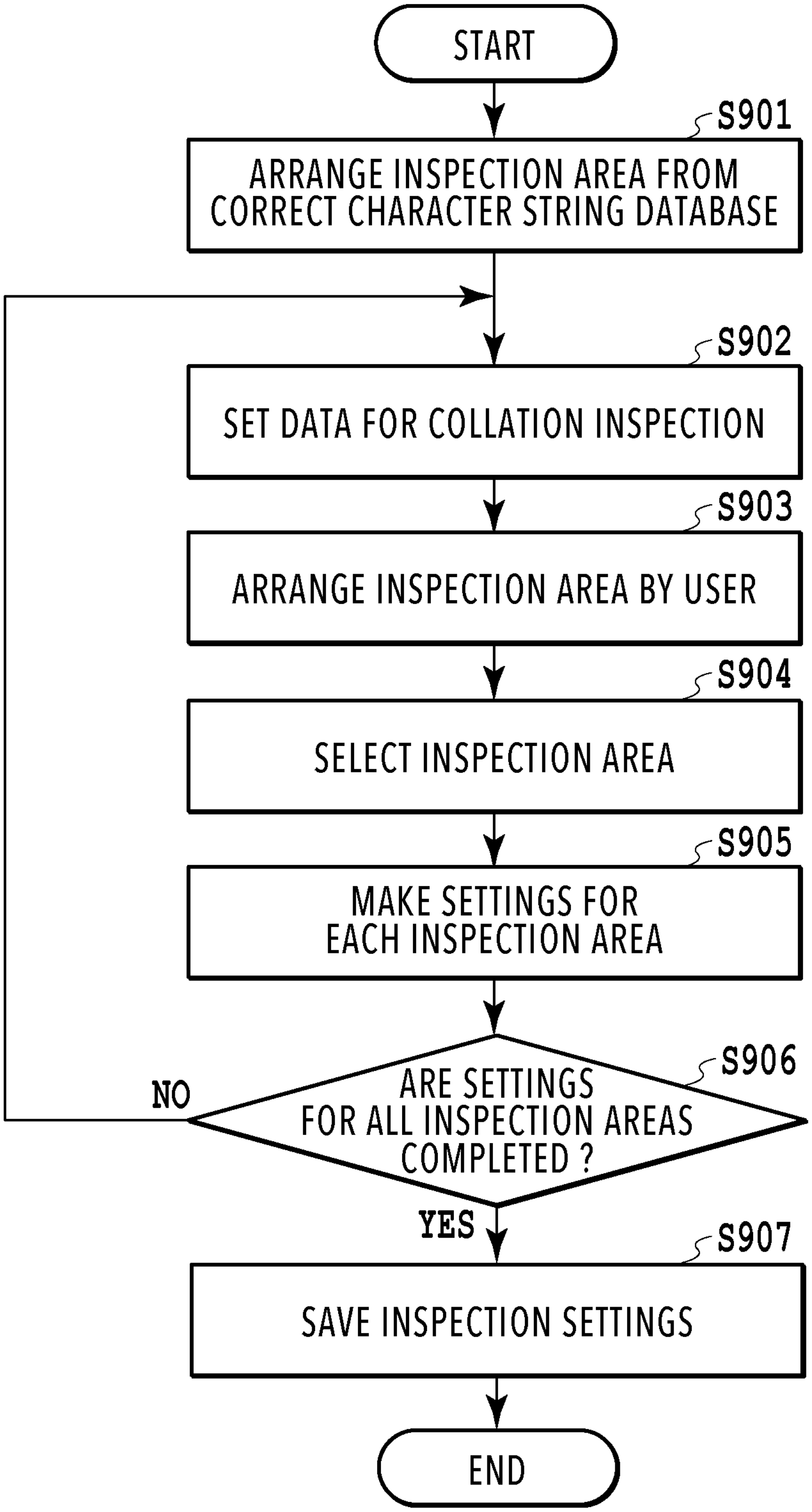
FIG. 9 is a flowchart of an inspection setting process.

FIG. 9 is a flowchart showing the inspection setting process executed by the CPU 226 of the inspection apparatus 108 in a case where an inspection setting start operation is performed on the inspection apparatus 108. Specifically, a user's operation is received from the inspection setting screen and the inspection area list displayed on the UI panel 102, and the CPU 226 of the inspection apparatus 108 executes various processes for making the inspection settings.

In S901, by using the correct character strings for the collation inspection and their coordinates obtained in S503, the CPU 226 of the inspection apparatus 108 initially arranges the inspection areas and registers the correct character string for each of the inspection areas initially arranged, and the process proceeds to S902. In the present embodiment, the CPU 226 of the inspection apparatus 108 initially arranges each of the character string inspection areas 803 by using the output coordinates 705, and further associates the initially-arranged character string inspection area 803 with the correct character string in the data for the collation inspection corresponding to the character string inspection area 803 based on the correct character strings 702. In S902, the CPU 226 of the inspection apparatus 108 receives a user's operation for setting data for the collation inspection from the inspection setting screen, and the process proceeds to S903. In the present embodiment, the operation for setting data for the collation inspection is a user's operation on a collation inspection data setting item displayed in an area 807 in FIG. 8A. In S903, the CPU 226 of the inspection apparatus 108 receives a user's operation for arranging an additional inspection area from the inspection setting screen and the process proceeds to S904. In the present embodiment, the operation for arranging the inspection area means a user's operation on the inspection area arrangement button 806 illustrated in FIG. 8B or 8C.

In S904, the CPU 226 of the inspection apparatus 108 receives a user's operation for selecting an inspection area from the inspection setting screen and the process proceeds to S905. In the present embodiment, the operation for selecting an inspection area means a user's operation on the inspection area selection button 805 illustrated in FIG. 8B or 8C. In S905, the CPU 226 of the inspection apparatus 108 receives user's setting operations for each inspection area from the inspection setting screen and the process proceeds to S906. In the present embodiment, the setting operations for each inspection area mean user's operations on the setting items for each inspection area displayed in the area 808 or 809 in FIG. 8B or 8C and an operation for selecting whether or not to perform a sequential number inspection (not shown).

In S906, the CPU 226 of the inspection apparatus 108 determines whether or not the user's inspection settings are completed. In a case where the CPU 226 of the inspection apparatus 108 determines that the inspection settings are completed, in other words, in a case where the user presses down the inspection setting completion button represented by the area 811, the process proceeds to S907. In a case where the CPU 226 of the inspection apparatus 108 determines that the inspection settings are not completed, the process returns to S902 and the user continues the inspection settings. In S907, the CPU 226 of the inspection apparatus 108 saves the settings in the storage unit 228 and ends the inspection setting process shown in FIG. 9.

Figure 10:
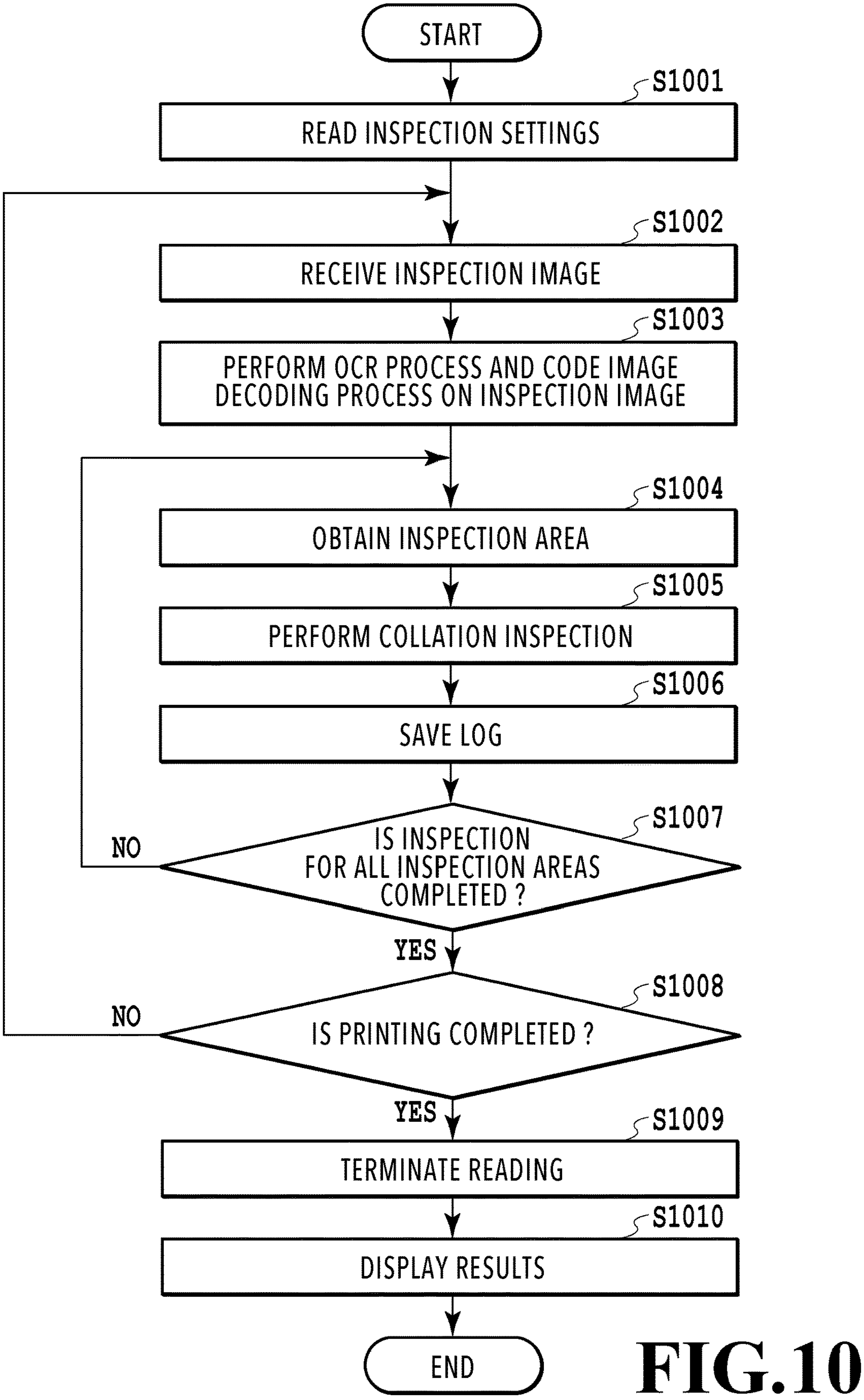
FIG. 10 is a flowchart showing details of inspection process.

Next, details of the inspection process are described with reference to a flowchart shown in FIG. 10. The inspection process shown in FIG. 10 is implemented by the CPU 226 of the inspection apparatus 108 executing various processes.

In S1001, the CPU 226 of the inspection apparatus 108 reads the inspection settings from the storage unit 228 to the RAM 227, and transits to a state of waiting for reception of a scanned image of a printed sheet. Then, the process proceeds to S1002. In S1002, the user executes a print job for an inspection target on the client computer 110. In response to the execution of the print job, the CPU 226 of the inspection apparatus 108 receives the inspection image, which the inspection unit 106 obtains by scanning the printed sheet, from the inspection unit 106 via the inspection apparatus I/F 215 and the inspection unit I/F 231. After the inspection image is received, the process proceeds to S1003.

In S1003, the CPU 226 of the inspection apparatus 108 executes the process in the flowchart in FIG. 6 on the inspection image to obtain the character strings and their coordinates from the inspection image, and then the process proceeds to S1004. In S1004, the CPU 226 of the inspection apparatus 108 obtains each inspection area from the inspection settings loaded on the RAM 227, and then the process proceeds to S1005. In S1005, for the inspection area, the CPU 226 of the inspection apparatus 108 performs the collation between the correct character string and the OCR result or the code image decoding result, and the process proceeds to S1006. In a case where the collation result is a mismatch, the CPU 226 of the inspection apparatus 108 determines that the inspection result of the inspection area is not good. In a case where the collation result is a match, the CPU 226 of the inspection apparatus 108 determines that the inspection result of the inspection area is good. In S1006, the CPU 226 of the inspection apparatus 108 stores the inspection result output in S1005 as a log to the RAM 227 and the process proceeds to S1007. In S1007, the CPU 226 of the inspection apparatus 108 determines whether or not the inspection for the inspection areas designated in the inspection settings is completed. In a case where the CPU 226 of the inspection apparatus 108 determines that the inspection is completed, the process proceeds to S1008. In a case where the CPU 226 of the inspection apparatus 108 determines that the inspection is not completed, the process returns to S1004.

In S1008, the CPU 226 of the inspection apparatus 108 determines whether or not the inspection on all the printed sheets to be inspected is completed. In a case where the CPU 226 of the inspection apparatus 108 determines that the inspection on all the printed sheets is not completed, the process returns to S1002. In a case where the CPU 226 of the inspection apparatus 108 determines that the inspection on all the printed sheets is completed, the process proceeds to S1009. In S1009, the CPU 226 of the inspection apparatus 108 terminates the state of waiting for reception of an inspection image of a printed sheet and the process proceeds to S1010. In S1010, the CPU 226 of the inspection apparatus 108 transmits the logs stored in the RAM 227 as the inspection results to the image forming apparatus 101 via the inspection unit 106. After receiving the inspection results, the CPU 201 of the image forming apparatus 101 displays the inspection results on the UI panel 102, and the CPU 226 of the inspection apparatus 108 ends the inspection process shown in FIG. 10. In S1010, the example in which the inspection results are displayed on the UI panel 102 is described, but an embodiment is not limited to this. The CPU 226 of the inspection apparatus 108 may display the inspection results on the display control unit 245 of the inspection apparatus 108. In addition, details of the inspection results of each printed sheet that fails the inspection may be displayed on the UI panel 102 or a UI screen of the display control unit 245. In this case, character strings in the printed sheet may be displayed such that the character strings, which match the correct character strings, are displayed in a certain color while the character strings, which do not match the correct character strings, are displayed in a color different from the certain color.

As described above, according to the present embodiment, before the inspection settings are made, the OCR process and the code image decoding process are performed on a reference image, and the character strings of the reference image corresponding to the correct character strings and the coordinates of the character strings are obtained. Thus, even if a reference image is the image data which do not have coordinate information of each object, the work of associating a character string and a code image in the reference image with their correct character strings is performed easily.

Second Embodiment

The first embodiment shows the example in which, before the inspection settings are made, the OCR process and the code image decoding process are performed and the coordinates resulting from the processes are associated with the correct character strings for the collation inspection. However, in the foregoing example, a correct character string cannot be associated with a character string in an OCR result or a code image decoding result unless they are identical. In contrast, in the present embodiment, a character string in the OCR result or the code image decoding result is associated with the correct character string even if they are not completely identical. Specifically, in a case where the character string in the OCR result or a decoding result (output character string) is similar to the correct character string, and can be concluded as the character string corresponding to the correct character string, an associating process of associating the position coordinates of the output character string with the correct character string is performed. The matters common to the present embodiment and the first embodiment are omitted herein from the description.

Figure 11:
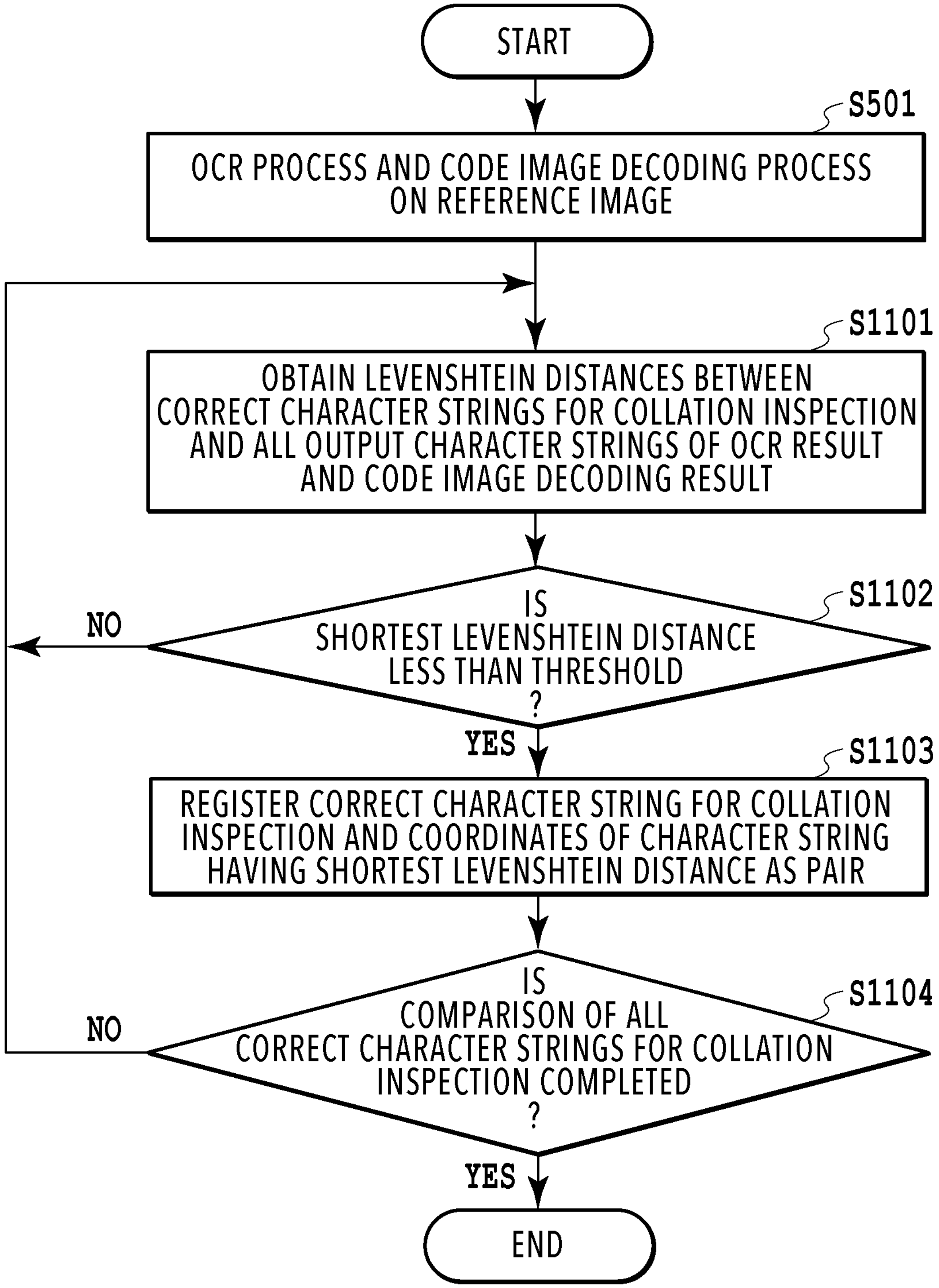
FIG. 11 is a flowchart showing a process of associating character strings in a reference image with their correct character strings.

The process in S403 of associating the reference image with the correct character strings in the present embodiment is described by using a flowchart in FIG. 11 and FIGS. 12A and 12B. FIG. 11 is the flowchart showing the process of associating the reference image with the correct character string for each inspection area in the present embodiment. FIG. 12A is an example of correct character strings for a collation inspection and OCR results and code image decoding results. FIG. 12B is an example of a correct character string database in the present embodiment.

The inspection process shown in FIG. 11 is implemented by the CPU 226 of the inspection apparatus 108 executing various processes for performing the process of associating the reference image with the correct character strings. A process in S501 of the flowchart in FIG. 11 is the same as the process in S501 of the flowchart in FIG. 5.

In S1101, the CPU 226 of the inspection apparatus 108 obtains a Levenshtein distance between each pair of the correct character strings for the collation inspection and all the output character strings of the OCR results and the code image decoding results (all the character strings extracted from the reference image). The Levenshtein distance is a distance indicating how different two character strings are. Specifically, the shorter the Levenshtein distance between two character strings, the more similar the two character strings. In other words, the Levenshtein distance indicates the similarity between two character strings. The Levenshtein distance expresses the minimum number of operations required to convert a certain character string to another character string. These operations are an operation of adding one character into the character string, an operation of deleting one character from the character string, and an operation of substituting another character for one character in the character string. For example, the Levenshtein distance between a correct character string "abc" and an output character string "abo" in FIG. 12A is 1. The Levenshtein distance between the correct character string "abc" and an output character string "efgh" is 4.

In S1102, the CPU 226 of the inspection apparatus 108 determines whether or not the shortest Levenshtein distance obtained in S1101 is less than a threshold. In a case where the Levenshtein distance is less than the threshold, the output character string having the shortest Levenshtein distance is similar to the correct character string and can be concluded as a character string corresponding to the correct character string. On the other hand, in a case where the shortest Levenshtein distance is equal to or more than the threshold, it can be determined that there is not output character string similar to the correct character string. In this way, even if an output character string has an error in OCR or an error in code image decoding, the output character string can be identified as corresponding to the correct character string by determining whether the output character string has a predetermined or higher similarity to the correct character string. In a case where the shortest Levenshtein distance is less than the threshold in S1102, the process proceeds to S1103. In a case where the shortest Levenshtein distance is equal to or more than the threshold in S1102, the process returns to S1101. The threshold may be set in advance or may be set by a user's input.

In S1103, the CPU 226 of the inspection apparatus 108 registers the correct character string for the collation inspection and the coordinates of the output character string having the shortest Levenshtein distance as a pair and the process proceeds to S1104. Specifically, the output coordinates 1203 of the output character string 1201 most similar to the correct character string 702 (the output character string having the shortest Levenshtein distance) are registered as the position coordinates corresponding to the correct character string 702. The above pair is registered in the correct character string database 1204 in the RAM 227. In S1104, the CPU 226 of the inspection apparatus 108 determines whether or not the comparison of all the correct character strings for the collation inspection is completed. In a case where the comparison of all the correct character strings is not completed, the process returns to S1101. In a case where the comparison of all the correct character strings is completed, the process of associating the position coordinates in the reference image with the correct character strings ends.

In the present embodiment, the output character string similar to the correct character string is determined by using the Levenshtein distance, but the distance is not limited to the Levenshtein distance. For example, the output character string similar to the correct character string may be determined by using another method capable of determining the similarity (for example, such as a Hamming distance).

According to the present embodiment, even if the result of the OCR process or the code image decoding process for the reference image, which is executed prior to the inspection process, has an error, it is possible to associate the position coordinates of the output character string obtained from the reference image in the OCR process or the decoding process with the correct character string. Thus, even if the reference image is the image data not having coordinate information of each object, the work of associating the character string and the code image in the reference image with their correct character strings is performed easily.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2023-078538, filed May 11, 2023, which is hereby incorporated by reference herein in its entirety.

What is claimed is:

1. An inspection apparatus comprising:

one or more processors and/or circuitry which function as a plurality of units comprising:

(1) an obtaining unit configured to (a) perform a process depending on a type of each of blocks extracted from a reference image to be used for inspection settings in a case of inspecting a printed sheet and (b) obtain a character string and coordinates indicating a position of the character string for each block;

(2) an associating unit configured to (a) automatically compare, with respect to similarity, the character string obtained from the reference image with a correct character string by using a Levenshtein distance between the character string obtained from the reference image and the correct character string to determine whether the character string obtained from the image corresponds to the correct character string and (b) associate, with the correct character string, the coordinates indicating the position of the character string determined as corresponding to the correct character string;

(3) an inspection setting unit configured to make set a setting regarding an inspection area to be inspected in the printed sheet based on the coordinates associated with the correct character string by the associating unit; and (4) an inspection unit configured to inspect an image obtained by reading the printed sheet to be inspected, based on the setting regarding the inspection area made by the inspection setting unit.

2. The inspection apparatus according to claim 1, wherein the inspection setting unit (1) displays an inspection setting screen in which the inspection area is initially arranged on the reference image based on the coordinates associated with the correct character string by the associating unit and (2) makes the setting regarding the inspection area based on a user's operation on the inspection setting screen.

3. The inspection apparatus according to claim 1, wherein the associating unit associates the coordinates indicating the position of the character string, which is obtained from the reference image and has the Levenshtein distance being the shortest and less than a threshold, with the correct character string.

4. The inspection apparatus according to claim 3, wherein the threshold for the Levenshtein distance is set in advance.

5. The inspection apparatus according to claim 3, wherein the one or more processors and/or circuitry further function as a display control unit configured to cause a display unit to display a user interface (UI) screen configured to receive the threshold for the Levenshtein distance from a user.

6. The inspection apparatus according to claim 1, wherein the one or more processors and/or circuitry further function as a display control unit configured to, in a case where the inspection unit determines that an inspection result of the image obtained by reading the printed sheet to be inspected is a failure, cause a display unit to display a detail of the inspection result.

7. The inspection apparatus according to claim 1, wherein the correct character string is a character string to be printed on the printed sheet.

8. The inspection apparatus according to claim 1, wherein the correct character string is a character string to be encoded in a code image to be printed on the printed sheet.

9. A method of controlling an inspection apparatus, the method comprising:

performing a process depending on a type of each of blocks extracted from a reference image to be used for inspection settings in a case of inspecting a printed sheet, and obtaining a character string and coordinates indicating a position of the character string for each block;

automatically comparing, with respect to similarity, the character string obtained from the reference image with a correct character string by using a Levenshtein distance between the character string obtained from the reference image and the correct character string to determine whether the character string obtained from the image corresponds to the correct character string;

associating, with the correct character string, the coordinates indicating the position of the character string determined as corresponding to the correct character string;

setting a setting regarding an inspection area to be inspected in the printed sheet based on the coordinates associated with the correct character string in the associating; and inspecting an image obtained by reading the printed sheet to be inspected, based on the setting regarding the inspection area set in the setting.

10. A non-transitory computer-readable storage medium storing a program for causing a computer to perform a method of controlling an inspection apparatus, the method comprising:

performing a process depending on a type of each of blocks extracted from a reference image to be used for inspection settings in a case of inspecting a printed sheet, and obtaining a character string and coordinates indicating a position of the character string for each block;

automatically comparing, with respect to similarity, the character string obtained from the reference image with a correct character string by using a Levenshtein distance between the character string obtained from the reference image and the correct character string to determine whether the character string obtained from the image corresponds to the correct character string;

associating, with the correct character string, the coordinates indicating the position of the character string determined as corresponding to the correct character string;

setting a setting regarding an inspection area to be inspected in the printed sheet based on the coordinates associated with the correct character string in the associating; and inspecting an image obtained by reading the printed sheet to be inspected, based on the setting regarding the inspection area set in the setting.

* * * * *